United States Patent
Lee et al.

(10) Patent No.: US 8,192,317 B2
(45) Date of Patent: Jun. 5, 2012

(54) REINFORCED BELT FOR POWERTURN APPLICATIONS

(75) Inventors: Eun Kyung Lee, Rocky Hill, CT (US); Edwin Lee Haines, Celina, OH (US); Douglas Brooks Deans, Middlesex, NC (US); Peter Earl Radding, Wake Forest, NC (US); Jenny Zhaoxia Yu, Hudson, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 232 days.

(21) Appl. No.: 11/603,739

(22) Filed: Nov. 22, 2006

(65) Prior Publication Data

US 2008/0119101 A1    May 22, 2008

(51) Int. Cl.
    *F16G 1/04* (2006.01)
(52) U.S. Cl. .................................. 474/267; 442/239
(58) Field of Classification Search ............ 442/203, 442/206–208, 218–220, 239; 474/260, 266, 474/267; 139/408, 413
    See application file for complete search history.

(56) References Cited

U.S. PATENT DOCUMENTS

| | | | | |
|---|---|---|---|---|
| 1,227,427 A | * | 5/1917 | Grabau et al. | 427/171 |
| 1,923,275 A | * | 8/1933 | Nollau | 442/218 |
| 2,088,447 A | * | 7/1937 | Specht | 245/8 |
| 3,100,565 A | | 8/1963 | Fry | |
| 3,296,062 A | * | 1/1967 | Truslow | 442/203 |
| 3,327,839 A | * | 6/1967 | Arnold et al. | 198/835 |
| 3,664,907 A | * | 5/1972 | Price | 428/57 |
| 3,951,256 A | * | 4/1976 | Gurewitz | 198/831 |
| 4,071,050 A | * | 1/1978 | Codorniu | 139/383 R |
| 4,503,113 A | * | 3/1985 | Smart | 442/199 |
| 4,564,985 A | * | 1/1986 | Tanabe | 28/142 |
| 5,104,726 A | * | 4/1992 | Ross | 442/207 |
| 5,164,249 A | * | 11/1992 | Tyler et al. | 442/207 |
| 5,169,709 A | * | 12/1992 | Fleischer | 442/207 |
| 5,376,440 A | * | 12/1994 | Koseki | 442/203 |
| 5,391,427 A | * | 2/1995 | Kumaran | 428/102 |
| 5,667,058 A | | 9/1997 | Bonnet | |
| 5,705,446 A | * | 1/1998 | Fujishiro et al. | 442/260 |
| 5,944,062 A | * | 8/1999 | Gampe | 139/383 A |
| 6,349,749 B1 | * | 2/2002 | Quigley | 139/383 R |
| 6,491,598 B1 | * | 12/2002 | Rosenboom | 474/260 |
| 6,834,760 B2 | | 12/2004 | Yamazaki | 198/831 |
| 2005/0287893 A1 | * | 12/2005 | Lee et al. | 442/104 |

FOREIGN PATENT DOCUMENTS

EP     1 609 899 A       12/2005
FR     2568275 A1   *   1/1986

* cited by examiner

*Primary Examiner* — Robert A Siconolfi
*Assistant Examiner* — Stephen Bowes
(74) *Attorney, Agent, or Firm* — Alvin T. Rockhill; Kathleen K. Bowen

(57) ABSTRACT

A reinforced conveyor belt has a plurality of fabric plies. One of the plies is an interwoven ply comprised of two layers of weft cords and a plurality of warp cords interweaving through the two layers of weft cords. Each warp cord has the following repeating weave pattern of passing over at least two but not more than five weft cords in the first weft layers, passing between the two weft layers for a distance of at least two weft cords, and passing under at least two but nor more than five weft cords in the second weft layer.

19 Claims, 4 Drawing Sheets

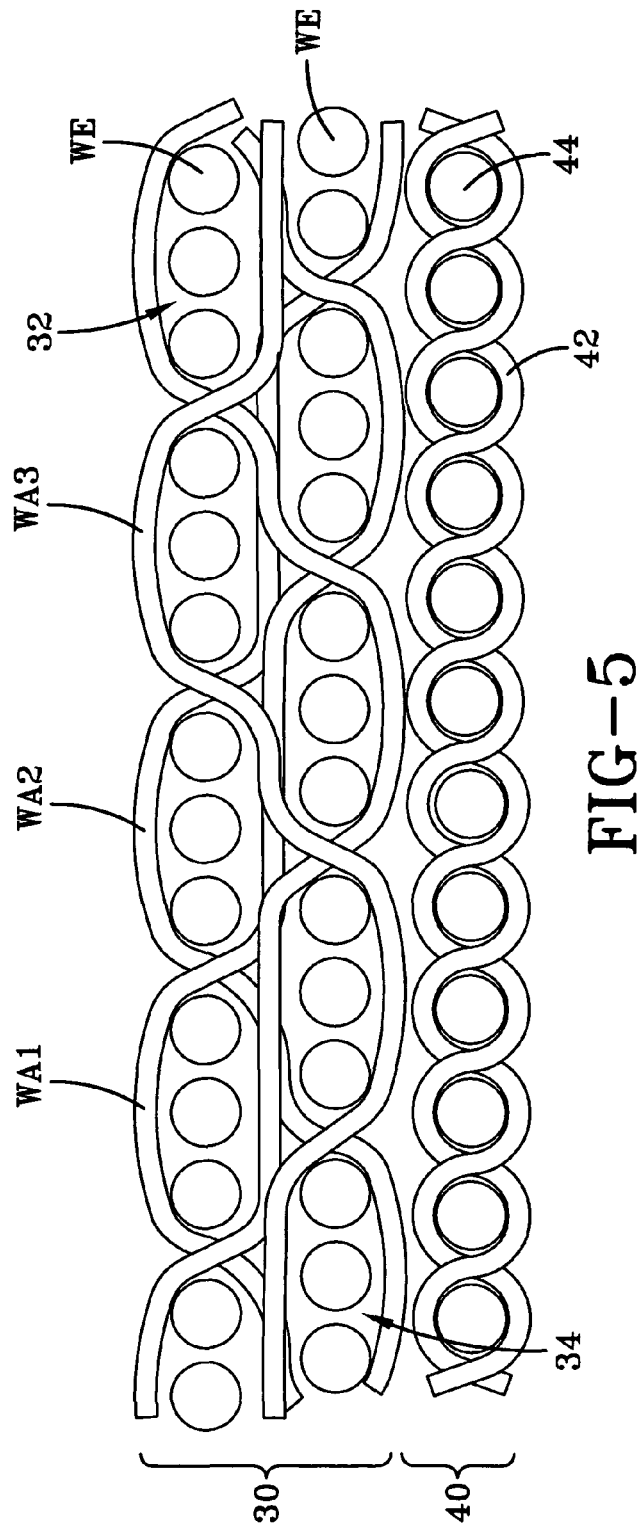

REINFORCED BELT FOR POWERTURN APPLICATIONS

FIELD OF THE INVENTION

The present invention is directed to a reinforced belt. More specifically, the reinforced belt has an internal construction designed to improve performance of the belt when used in powerturn applications.

BACKGROUND OF THE INVENTION

Powerturn belts are a type of specialized conveyor belts wherein the conveyor belt does not travel in a straight path parallel to its longitudinal length. At a minimum, powerturn belts travel through a 30° arc. At the extreme end, a powerturn belt will travel multiple 360° turns in what is referred to as a spiral conveyor. Such belts have applications in a variety of industries, varying from warehouses, airports, and the food industry.

To assist the belt in turning, at least one longitudinal edge of the belt is provided with means that are mechanically gripped by the conveyor system. Such means includes guide means as shown in U.S. Pat. No. 3,951,256 and resin moldings, such as disclosed in U.S. Pat. No. 6,834,760.

Conventional conveyor belts for powerturn applications are formed of several thin plies of a simple warp/weft woven fabric, wherein both plies have the same reinforcement structure. The reinforcement structure is embedded in either an elastomeric or plastic matrix such as PVC, depending on the powerturn system requirements. While such belts have proven satisfactory in the past, such belts fail to consider the different tensions placed on the belt due to the curves and u-turns the belt travels in the powerturn system. This can lead to an reduction in durability and performance of the conveyor belt.

SUMMARY OF THE INVENTION

The present invention is directed to a conveyor belt having a multi-layered construction, wherein, for powerturn applications, the belt has an improved performance.

Disclosed herein is a continuous length belting comprising two plies of fabric. One of the plies is an interwoven ply comprised of two layers of weft cords and a plurality of warp cords interweaving through the two layers of weft cords. Each warp cord has the following repeating weave pattern of passing over at least two but not more than five weft cords in the first weft layer's, passing between the two weft layers for a distance of at least two weft cords, and passing under at least two but not more than five weft cords in the second weft layer. Preferably, each warp cord in the first ply passes over at least three but not more than four weft cords in the first weft layer and passes under at least three but not more than four weft cords in the second weft layer.

In another aspect of the invention, the cords of the first fabric ply are selected from the group consisting of polyester, polyamide, cotton, fiberglass, carbon fiber, polybenzoxazole (PBO) fibers or any blends or mixes thereof.

In another aspect of the invention, the second ply of fabric has a weave pattern comprising a single layer of weft cords. The weave pattern is selected from the group consisting of plain weave, satin weave, or twill weave.

Also disclosed is a powerturn conveyor belting having a finite length, closed loop structure. The belting has at least two plies of fabric. One of the plies is an interwoven ply comprised of two layers of weft cords and a plurality of warp cords interweaving through the two layers of weft cords, each warp cord having the following repeating weave pattern of passing over at least two but not more than five weft cords in the first weft layers, passing between the two weft layers for a distance of at least two weft cords, and passing under at least two but not more than five weft cords in the second weft layer. Preferably, each warp cord in the first ply passes over at least three but not more than four weft cords in the first weft layer and passes under at least three but not more than four weft cords in the second weft layer.

In another aspect of the powerturn belting, the cords of the first fabric ply are selected from the group consisting of polyester, polyamide, cotton, nylon, fiberglass, carbon fiber, polybenzoxazole (PBO) fibers or any blends or mixes thereof.

In another aspect of the invention, the first fabric ply is the outermost ply of the closed loop structure, creating a more durable belting surface for use in heavy duty powerturn applications.

In another aspect of the invention, the second ply of fabric has a weave pattern comprising a single layer of weft cords. The weave pattern is selected from the group consisting of plain weave, satin weave, or twill weave.

BRIEF DESCRIPTION OF THE DRAWINGS

The invention will be described by way of example and with reference to the accompanying drawings in which:

FIG. 5 illustrates the embodiment of the invention where each warp thread passes over 3 weft threads on the fist tier and below 3 on the second tier.

DETAILED DESCRIPTION OF THE INVENTION

Figure 1:
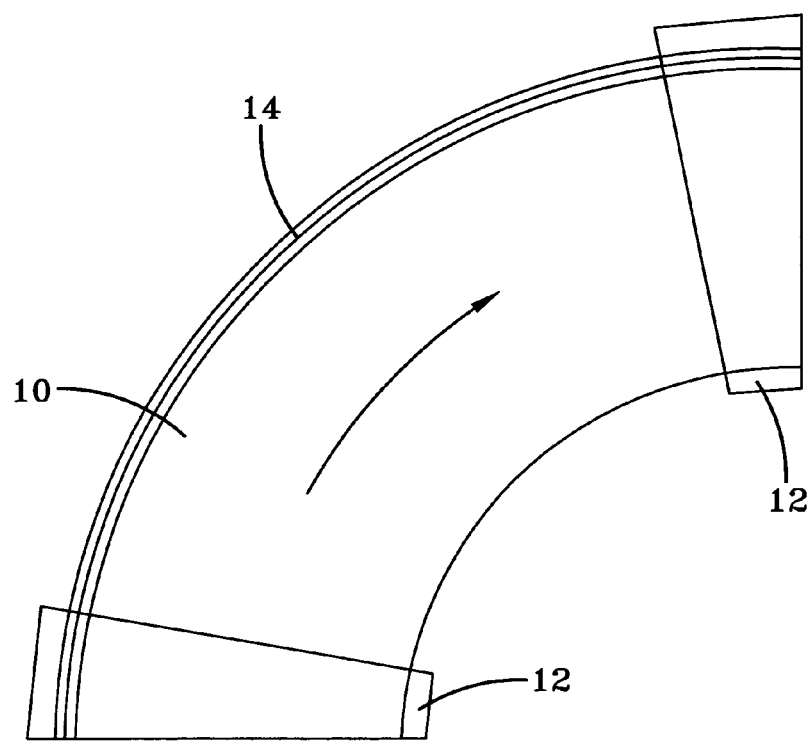
FIG. 1 illustrates a 90° powerturn application.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employ basically the same components with variations in location or quantity thereby giving rise to the alternative constructions in which the inventive concept can be practiced.

FIG. 1 illustrates a powerturn conveyor belt system having a direction of travel indicated by the arrow D. The system has the basic elements of a finite length, closed loop belt 10 that travels about a pair of conical pulleys 12. Along the longest edge of the belt 10 is a tracking mechanism 14 that connects the belt 10 to the powerturn system. The specifics of the tracking system 14 are not critical to the present invention, and any known or conventional tracking system may be employed.

Figure 2B:
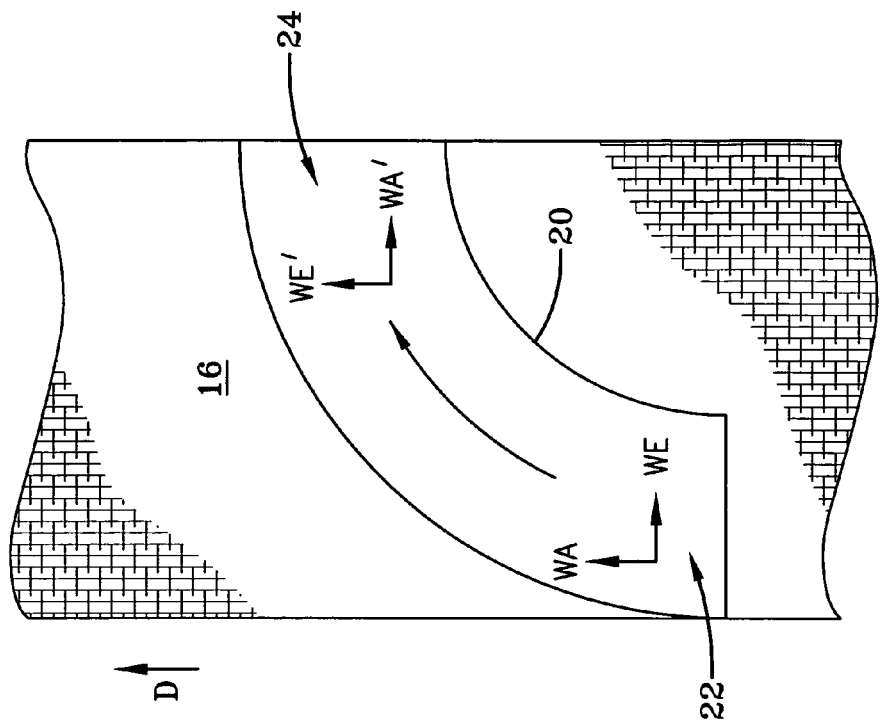
FIG. 2B is an overview of a continuous length belting showing the cutting lines for a belting section to be used in manufacturing a powerturn belting.
Figure 2A:
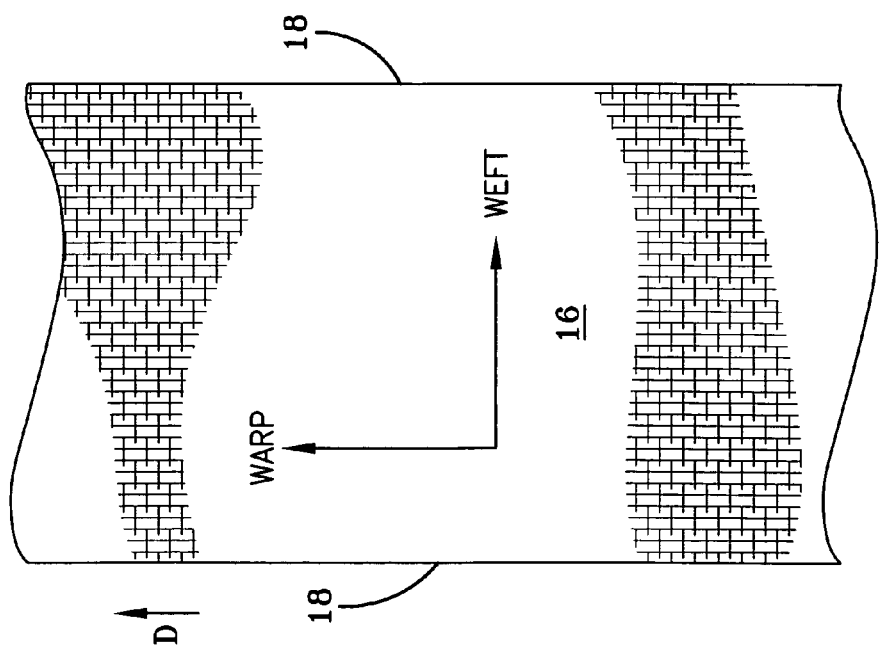
FIG. 2A is an overview of a continuous length belting.

The finite length, powerturn, closed loop belt 10 is manufactured first as a continuous length belting 16, having a length in direction D, opposed lateral edges 18, and reinforcing cords, see FIG. 2A. Reinforcing cords within the continuous length belt are defined as warp cords when the cords are parallel to the length direction D of the continuous belt and as weft cords when transverse, or perpendicular, to the length direction E.

To form the finite length, closed loop belt for the powerturn application, the continuous length belt is cut into finite length belting arcs 20, see FIG. 2B, and spliced to form the closed loop belt 10. Due to the arc cuts in the continuous length belting 16, along a first portion 22 of the finite length belting arc 20, the reinforcing warp cords WA and weft cords WE of the belting arc correspond to the warp and weft cords as the continuous length belt 16. However, in the second portion 24 of the finite length belting arc 20, due to the arc shape and the direction of travel T of the finite length, closed loop belt 10, past the mid-point of the finite length belting arc 20, the cords that were the warp cords WA in the first portion 22 begin to function as weft cords WE' and the cords that were the weft cords WE in the first portion begin to function as warp cords WA'.

Figure 3:
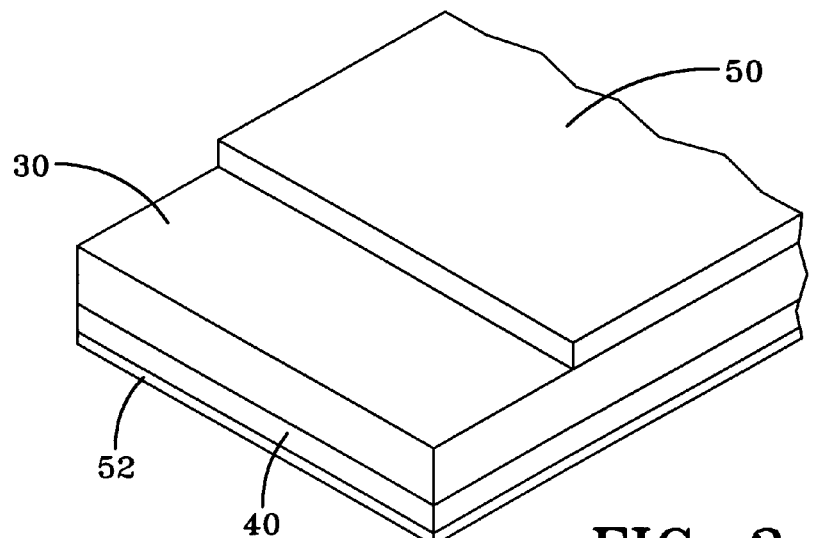
FIG. 3 is a fabric cross-sectional view in accordance with the present invention.
Figure 4:
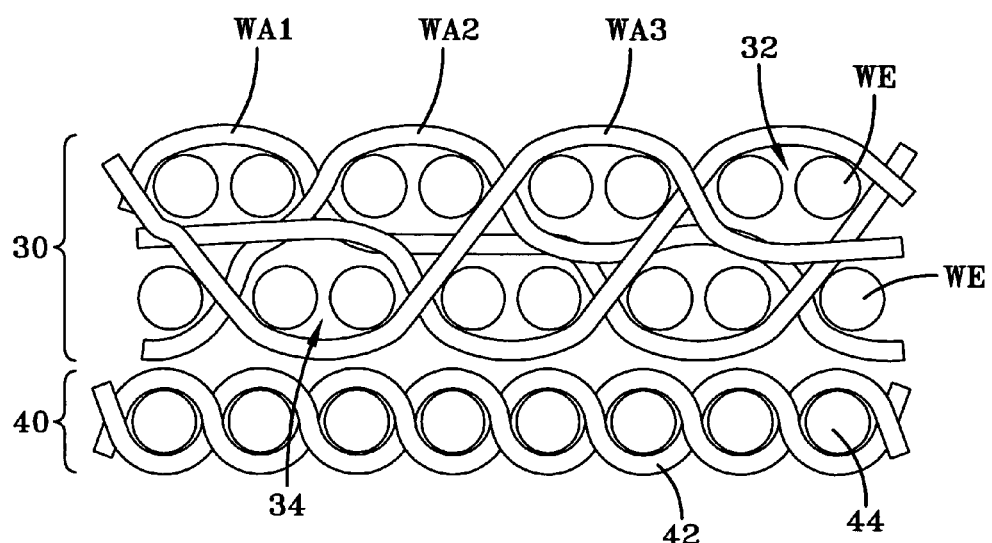
FIG. 4 is a more detailed view of the fabric plies used in the belting.

In the belt of the present invention, the continuous length belting 16, which is cut and spliced to form the finite length, closed loop belt 10, is a two-ply structure having first and second reinforcing plies embedded in a matrix and bonded together, see FIG. 3. The top ply 30 is a composite ply formed of two layers 32, 34 of weft cords WE, and repeating sequence of three warp cords WA1, WA2, WA3, interwoven among the two layers 32, 34 of weft cords WE, see FIG. 4. Each warp cord WA1, WA2, WA3 passes over at least two weft cords WE in the top weft layer 32, between the two weft cord layers 32, 34 for a length approximately equal to at least two, preferably three, but not more than five, weft cords WE, and then under at least two weft cords WE in the bottom weft layer 34 before traveling back up to the top weft layer 32 to repeat the weaving pattern. The illustrated warp cords WA1, WA2, WA3 pass over and under two weft cords WE in each layer 32, 34. The maximum number of weft cords WE in each layer being passed over and under by the warp cords WA1, WA2, WA3 is five weft cords WE, preferably three to four weft cords WE. When the pass over/pass under number of weft cords WE is greater than five than durability of the top ply 30 may be compromised for situations where the belt is subjected to high stresses and loads.

In the top ply 30, the three warp cords WA1, WA2, WA3 are adjacent to each other in the completed fabric, creating a tight fabric pattern. The warp and weft cords WA1, WA2, WA3, WE of the top ply are preferably formed of the same material; however, to vary the strengths of the fabric in the different directions, the warp and weft yarns may be formed of different materials. The cords may be selected from the group of polyester, polyamide, cotton, fiberglass, carbon fiber, polybenzoxazole (PBO) fibers or any blends or mixes thereof.

The bottom ply 40 is a simpler fabric ply than the top ply 30 and has only a single layer of weft cords 44. The fabric ply 40 is a simple warp and weft woven ply, with each warp cord 42 passing over and under the weft cords 44 in a pattern commonly referred to as a plain weave. The bottom ply 40 may alternatively be woven in a conventional satin or twill weave. The cords 42, 44 of the bottom ply 40 are selected from the group of polyester, polyamide, cotton, nylon, fiberglass, carbon fiber, polybenzoxazole (PBO) fibers or any blends or mixes thereof.

In the belting 16 and the closed loop belt 10, due to the different types of fabric plies 30, 40, the top ply 30 provides the majority of the strength to the belting 16 and closed loop belt and provides the belting 16 and the closed loop belt 10 with improved durability.

Each fabric ply 30, 40 is embedded in an elastomeric or thermoplastic material, such as rubber or a polyvinyl chloride (pvc) compound or other types of resins used for conveyor belt applications. The embedding resin is selected based upon the intended end use of the belting. The two ply structure may be provided with a top and bottom cover layer 50, 52, that may or may not be provided with an imprint to create a three dimensional, or roughened, surface. When a top cover layer 50 is provided, the cover layer is not reinforced with any type of continuous cords or yarns. The bottom cover layer may or may not be reinforced by textile means.

While the use of the continuous length belting is disclosed as being particularly useful for powerturn applications, the belting may be used in other conveyor belt applications wherein a closed loop system is created by fastening ends of the belting together.

What is claimed is:

1. A continuous length belting comprising a top cover layer, a bottom cover layer, two plies of fabric and a tracking mechanism that is adapted for connecting the belting to a powerturn system, wherein the top cover layer is not reinforced with any type of continuous cords or yarns, wherein each fabric ply is embedded in an elastomeric or thermoplastic material, wherein the first fabric ply is an interwoven ply comprised of two layers of weft cords and a plurality of warp cords interweaving through the two layers of weft cords, each warp cord having the following repeating weave pattern of passing over three or four cords in the first weft layer, passing between the two weft layers for a distance of at least two weft cords as measured by passing under at least two weft cords in the first weft layer and by passing over at least two weft cords in the second weft layer before passing through the second weft layer, and then passing under three or four weft cords in the second weft layer.

2. The continuous length belting of claim 1 wherein the second fabric ply has a weave pattern selected from the group consisting of plain weave, satin weave, or twill weave.

3. The continuous length belting of claim 1 wherein the cords of the first fabric ply are selected from the group consisting of polyester, polyamide, cotton, fiberglass, carbon fiber, polybenzoxazole (PBO) fibers or any blends of mixes thereof.

4. The continuous length belting of claim 1 wherein each fabric ply is embedded in an elastomeric or thermoplastic resin.

5. The continuous belting of claim 1 wherein the second fabric ply has a weave pattern comprising a single layer of weft cords.

6. The continuous belting of claim 5 wherein each warp cord in the first fabric ply is woven into the fabric ply according to the following sequential weave pattern wherein the warp cord (1) passes over three weft cords in the first weft layer, (2) passes through the first weft layer and then continues between the two weft layers for a distance of at least two weft cords as measured by passing under at least two weft cords in the first weft layer and by passing over at least two weft cords in the second weft layer, (3) passes through the second weft layer and then continues under three weft cords in the second weft layer, and (4) passes through second weft layer and the first weft layer at which point the sequential weave pattern repeats; wherein the second fabric layer has a plain weave pattern with each warp cord passing over and under the weft cords.

7. The continuous length belting of claim 6 wherein the cords of the first fabric ply are comprised of polybenzoxazole.

8. The continuous belting of claim 1 wherein the belting has a pair of opposing ends and the ends are fastened together to create a closed loop belt.

9. A powerturn conveyor belting having a finite length, closed loop structure, the belting being formed of a top cover layer, a bottom cover layer, at least two plies of fabric and a tracking mechanism that is adapted for connecting the belting to a powerturn system, wherein the top cover layer is not reinforced with any type of continuous cords or yarns, wherein each fabric ply is embedded in an elastomeric or thermoplastic material, wherein the first fabric ply is an interwoven ply comprised of two layers of weft cords and a plurality of warp cords interweaving through the two layers of weft cords, each warp cord having the following repeating weave pattern of passing over three or four weft cords in the first weft layer, passing between the two weft layers for a distance of at least two weft cords as measured by passing under at least two weft cords in the first weft layer and by passing over at least two weft cords in the second weft layer before passing through the second weft layer, and then passing under three or four weft cords in the second weft layer.

10. The belting of claim 9 wherein the second fabric ply has a weave pattern selected from the group consisting of plain weave, satin weave, or twill weave.

11. The belting of claim 9 wherein the cords of the first fabric ply are selected from the group consisting of polyester, polyamide, cotton, nylon, fiberglass, carbon fiber, polybenzoxazole (PBO) fibers or any blends or mixes thereof.

12. The belting of claim 9 wherein the second fabric ply has a weave pattern comprising a single layer of weft cords.

13. The belting of claim 12 wherein each warp cord in the first fabric ply is woven into the fabric ply according to the following sequential weave pattern wherein the warp cord (1) passes over three weft cords in the first weft layer, (2) passes through the first weft layer and then continues between the two weft layers for a distance of at least two weft cords as measured by passing under at least two weft cords in the first weft layer and by passing over at least two weft cords in the second weft layer, (3) passes through the second weft layer and then continues under three weft cords in the second weft layer, and (4) passes through second weft layer and the first weft layer at which point the sequential weave pattern repeats; wherein the second fabric layer has a plain weave pattern with each warp cord passing over and under the weft cords.

14. The belting of claim 13 wherein the cords of the first fabric ply are comprised of polybenzoxazole.

15. The belting of claim 9 wherein the belt has an outer side and an internal side, and the first fabric ply is closer to the outer side than the second fabric ply.

16. The belting of claim 9 wherein the second fabric layer has a satin weave pattern.

17. The belting of claim 9 wherein the second fabric layer has a twill weave pattern.

18. The belting of claim 9 wherein each fabric ply is embedded in polyvinyl chloride.

19. The belting of claim 9 wherein each fabric ply is embedded in the thermoplastic material.

* * * * *